(Model.)

C. PALMLEAF.
DISH CLEANER.

No. 520,829. Patented June 5, 1894.

(Model.)

C. PALMLEAF.
DISH CLEANER.

No. 520,829. Patented June 5, 1894.

Witnesses.
Corrine B. Leland
John S. Jurey

Inventor.
Charles Palmleaf
by H. L. Reynolds
his Atty.

UNITED STATES PATENT OFFICE.

CHARLES PALMLEAF, OF SEATTLE, WASHINGTON.

DISH-CLEANER.

SPECIFICATION forming part of Letters Patent No. 520,829, dated June 5, 1894.

Application filed October 19, 1893. Serial No. 488,657. (Model.)

*To all whom it may concern:*

Be it known that I, CHARLES PALMLEAF, a citizen of the United States, residing at Seattle, in the county of King and State of Washington, have invented certain new and useful Improvements in Dish-Washers; and I do hereby declare the following to be a full, clear, and exact description of the invention, such as will enable others skilled in the art to which it appertains to make and use the same.

My invention is an improved form of dish-washer, being an improvement upon the machine shown in Letters Patent No. 499,031, granted to me June 6, 1893. In this improved form, the pumps, which are two in number, are operated by a lever acting upon a walking beam, and the basket is made to revolve at the will of the operator by engaging therewith a movable projection on the pump lever.

Figure 1:
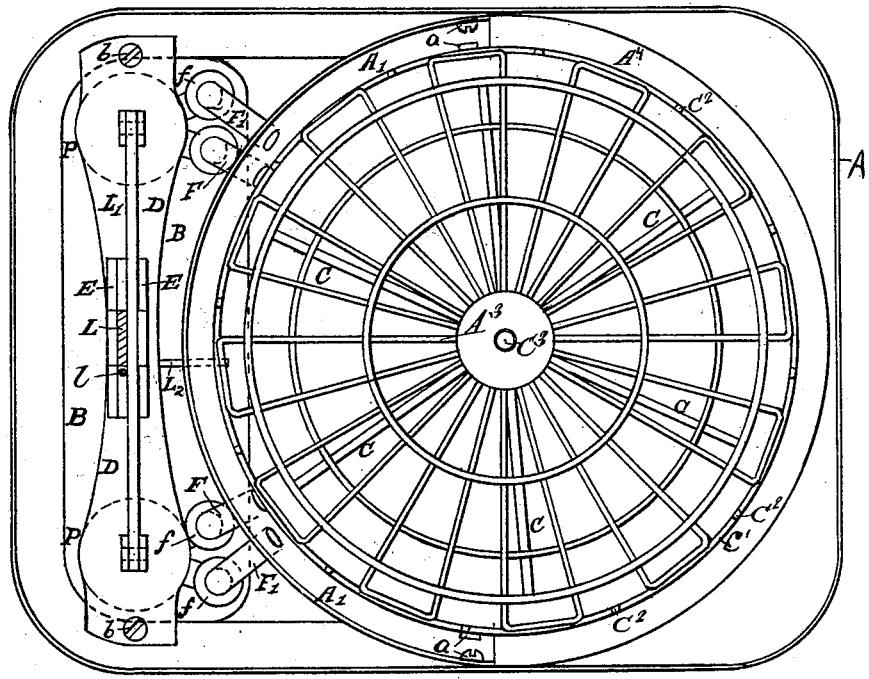
Figure 2:
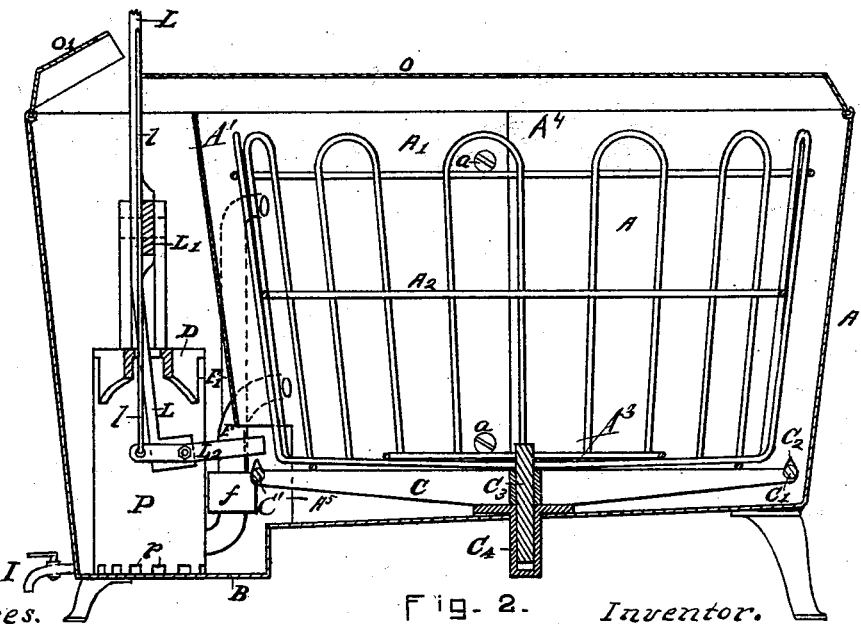
Figure 4:
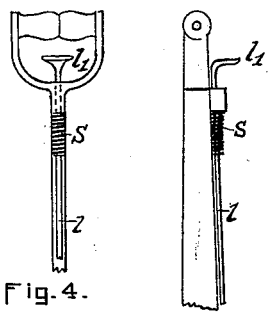
Figure 3:
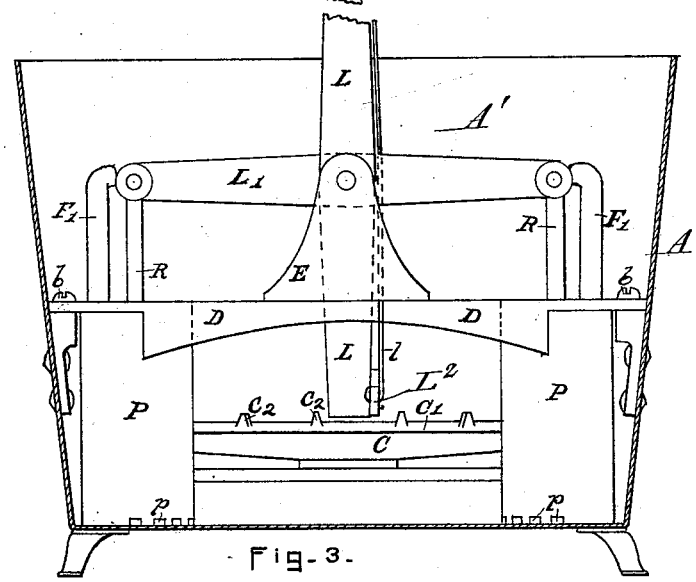
Figure 6:
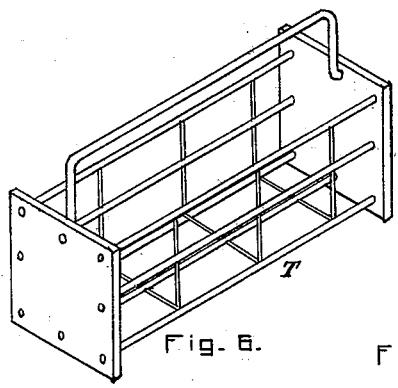
Figure 5:
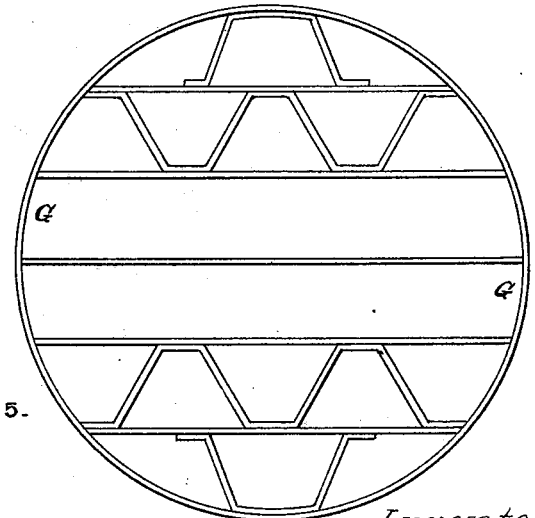

Figure 1 is a plan view of my dish-washer with the cover removed. Fig. 2 is a central longitudinal sectional view thereof. Fig. 3 is an end elevation of the pumps and their operating mechanism. Fig. 4 is a side view of the upper end of the hand lever. Fig. 5 is a grating which may be placed centrally in a basket upon suitable supports and serves to hold the dishes. Fig. 6 is a small crate or basket intended for small things such as knives and forks.

Similar letters of reference refer to similar parts in the various figures.

The body or box A, which contains the working mechanism has one end rounded, being similar in shape to that of a tub. A partition A', continues the circular shape of the rounded end and forms therewith the rounded tub $A^4$. The bottom of this tub slopes toward the partition. A section of the side at the lowest point as $A^5$, is taken out, permitting the water to flow out and also permitting a connection to be made between the operating lever L, and the revolving basket support C. This revolving support consists of a set of six arms radiating from the center where they are connected to a pin $C^3$, which sits in a socket or hole $C^4$ in the bottom of the tub. The outer ends of these arms are connected by the ring C', which has on its upper side the projections $C^2$, placed at short regular intervals. The basket $A^3$, which is composed of wires constructed in an open manner, sits upon this pivoted grate and has a hole in its center which fits over the upper end of the pivot $C^3$.

At the lower side of the body or box and outside the circular portion is the sink or depression B, which is lower than the bottom of the tub. In this sit the two pump cylinders P, P. These are ordinary force pumps having holes $p$, in their bottom for the admission of water. These are connected at their upper end by the bridge D, which forms a support for the pump levers. Supports E, E, upon this bridge carry the levers L and L', the latter being connected to the rods R R, which have upon their lower ends the pistons of the force pumps. The lever L is fixed to the levers L', so as to move therewith. This lever L, has a handhold upon the upper end. Pivoted upon the lower end of the lever L and extending horizontally toward the basket is the short lever or arm $L^2$. To the end of this lever $L^2$, which is farthest from the basket, is connected a wire or small rod $l$, which extends up alongside the lever L, through guides thereon to a point just below the handhold upon its upper end. The upper end of this rod $l$, is formed into a broadened finger piece $l'$, which is so placed with relation to the handhold that it may be engaged by one finger of the operating hand to draw it up. It is held down by the spring S, which surrounds it near its upper end. The end of the lever $L^2$, which is toward the basket, extends just over the ring C', which has the projections $C^2$, upon its upper surface. When the spring S is permitted to hold down the rod $l$, the lever $L^2$, will clear these projections and the working of the lever L will have no rotative effect on the ring C', or the basket supported on the grating or support of which the ring C', is a part. If, however, the end of the lever $L^2$, is forced down so as to engage these projections by pulling up upon the finger piece $l'$, and thus upon the rod $l$, while the lever L, is moving in one direction and is allowed to be raised by the spring S, so as to clear these projections, while going in the other direction, it will communicate a series of rotative impulses to the basket support. If these impulses were made to follow each other quickly, as would be the case if the lever $l^2$ were depressed during each movement in the same direction, the rotation of the basket would be continuous. The direction of rotation would depend upon in which direction the lever L² was moving when it was made to engage the projections C². In this way the basket may be made to rotate in either direction and either continuously or a little at a time.

From the bottom of each pump cylinder come two pipes F, and F'. These pipes have valves in them at f, to prevent backward flow of the water. The pipe F, extends upward to a little above the bottom of the basket where it enters the side of the tub. The other pipe F', extends to near the top of the basket, where it enters the side of the tub. Each pump cylinder therefore throws two jets into the basket, one near the top and one a little above the bottom, and the jets from each cylinder, being at quite an angle to those of the other, the chance of reaching all sides of the dishes is much increased.

The semi-circular partition A', and the pumps may be removed for convenience in cleaning when desired, by removing the screws a, a, and b, b. The grate or shelf G, shown in Fig. 5, is to be placed within the basket upon the wire A², where it serves to support any dishes placed upon it and to hold on their edge plates and similarly shaped dishes resting upon the bottom of the basket. The small removable tray or basket T, shown in Fig. 6, is designed to hold spoons, knives or any such small articles so that they may be removed all at once.

A faucet I, is provided for drawing off the water. The dishes may first be washed in suds water, and this drawn off and clean hot water added which rinses them and leaves them hot so that they will dry themselves.

Having thus described my invention, what I claim, and desire to secure by Letters Patent, is—

1. In a dish-washer, the combination with the casing of a revoluble grating therein supported upon a central pivot, a basket supported upon said grating, of a pair of force pumps, two pipes from each discharging respectively near the top and bottom of the basket, the jets from each pump being at an angle with those of the other, a rocking lever for operating the pumps, a hand lever connected thereto, a lever pivoted to the lower end of the hand lever and in such a position that it may be made to engage the grating to rotate it and means whereby it may be made to so engage it at the will of the operator, substantially as shown and described.

2. In a dish washer, the combination with a casing, of a partition therein forming a circular tub, a central socket in the bottom of the tub, a revoluble grating having a pin to fit said socket, a removable basket for holding dishes resting upon said grating, force pumps for throwing water into the basket, means for operating said pumps, and means connected with said pumps operating means that are adapted to engage the supporting grating at the will of the operator whereby the said grating may be made to revolve, substantially as described.

3. In a dishwasher, the combination with a casing, of a partition therein forming a circular tub, a central socket in the bottom of the tub, a revoluble grating having a pin to fit said socket, and a circular ring upon its outer edge having projections upon it at short intervals, a wire basket having a central hole in its bottom for engaging the upper end which rests upon the central pin and the supporting grating, of the pumps for forcing water into the basket, lever L and connections therefrom to the pumps for operating them, an engaging lever L², pivoted upon the main lever L, a spring for holding it normally clear of the basket-supporting grating, and a rod and finger piece connected to this engaging lever, whereby it may be depressed at will so as to engage the projections on the ring of the supporting grating to revolve the same at the will of the operator, substantially as shown and described.

In testimony whereof I affix my signature in presence of two witnesses.

CHARLES PALMLEAF.

Witnesses:
H. L. REYNOLDS,
JOHN S. JUREY.